(12) United States Patent
Gissel et al.

(10) Patent No.: US 8,869,177 B2
(45) Date of Patent: Oct. 21, 2014

(54) DECOUPLING COMPONENTS OF A SOFTWARE SYSTEM AT COMPILE TIME AND LOAD TIME

(75) Inventors: Thomas R. Gissel, Apex, NC (US);
Marc E. Haberkorn, Raleigh, NC (US);
Sai G. Rathnam, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2010 days.

(21) Appl. No.: 11/851,164

(22) Filed: Sep. 6, 2007

(65) Prior Publication Data
US 2009/0070791 A1    Mar. 12, 2009

(51) Int. Cl.
*G06F 9/44* (2006.01)
*G06F 3/00* (2006.01)
*G06F 13/00* (2006.01)

(52) U.S. Cl.
CPC ........................................ *G06F 8/20* (2013.01)
USPC .......................................... 719/330; 717/106

(58) Field of Classification Search
CPC ....................................................... G06F 8/20
See application file for complete search history.

(56) References Cited

U.S. PATENT DOCUMENTS

| | | | |
|---|---|---|---|
| 7,398,533 B1 * | 7/2008 | Slaughter et al. | 719/328 |
| 7,519,977 B2 * | 4/2009 | Meduri et al. | 719/330 |
| 7,657,899 B2 * | 2/2010 | Werner | 719/330 |
| 8,291,375 B2 * | 10/2012 | Ireland | 717/107 |
| 2005/0081216 A1 * | 4/2005 | Taylor | 719/315 |

OTHER PUBLICATIONS

Patrick Thomas Eugster; Dynamic Proxies for Classes: Towards TypeSafe and Decoupled Remote Object Interaction; EPFL Technical Report 200317; 2003; 18 pages.*

* cited by examiner

*Primary Examiner* — H S Sough
*Assistant Examiner* — Kimberly Jordan
(74) *Attorney, Agent, or Firm* — Yudell Isidore PLLC; Jeanine Ray

(57) ABSTRACT

A method, system and computer program product for decoupling components of a software system at load/compile time to accelerate application startup times. In particular, a software components partitioning (SCP) utility pre-defines a number of (implementation) classes to initiate and facilitate the decoupling process. The SCP utility allows the method names and argument lists to be recorded from a remote interface into a local interface which emulates the remote interface. The local interface is augmented with an annotation to define the remote interface. Additionally, a pre-defined keyword is appended to the name of the local interface to enable the creation of a (pre-defined) classname. Furthermore, when the classname is loaded, an implementation (via a Java implementation class, for example) for the remote class is loaded, and the implementation is associated with a dynamic proxy that implements both the local and remote interfaces, on demand.

12 Claims, 4 Drawing Sheets

Figure 2B

```
public class RemoteInterfaceProxyImpl implements
RemoteInterfaceProxy {
    public int GetNumber{
        <body>
    } public String GetName {
        <body>
    }
}
```

210 211 — class declaration
212 — methods

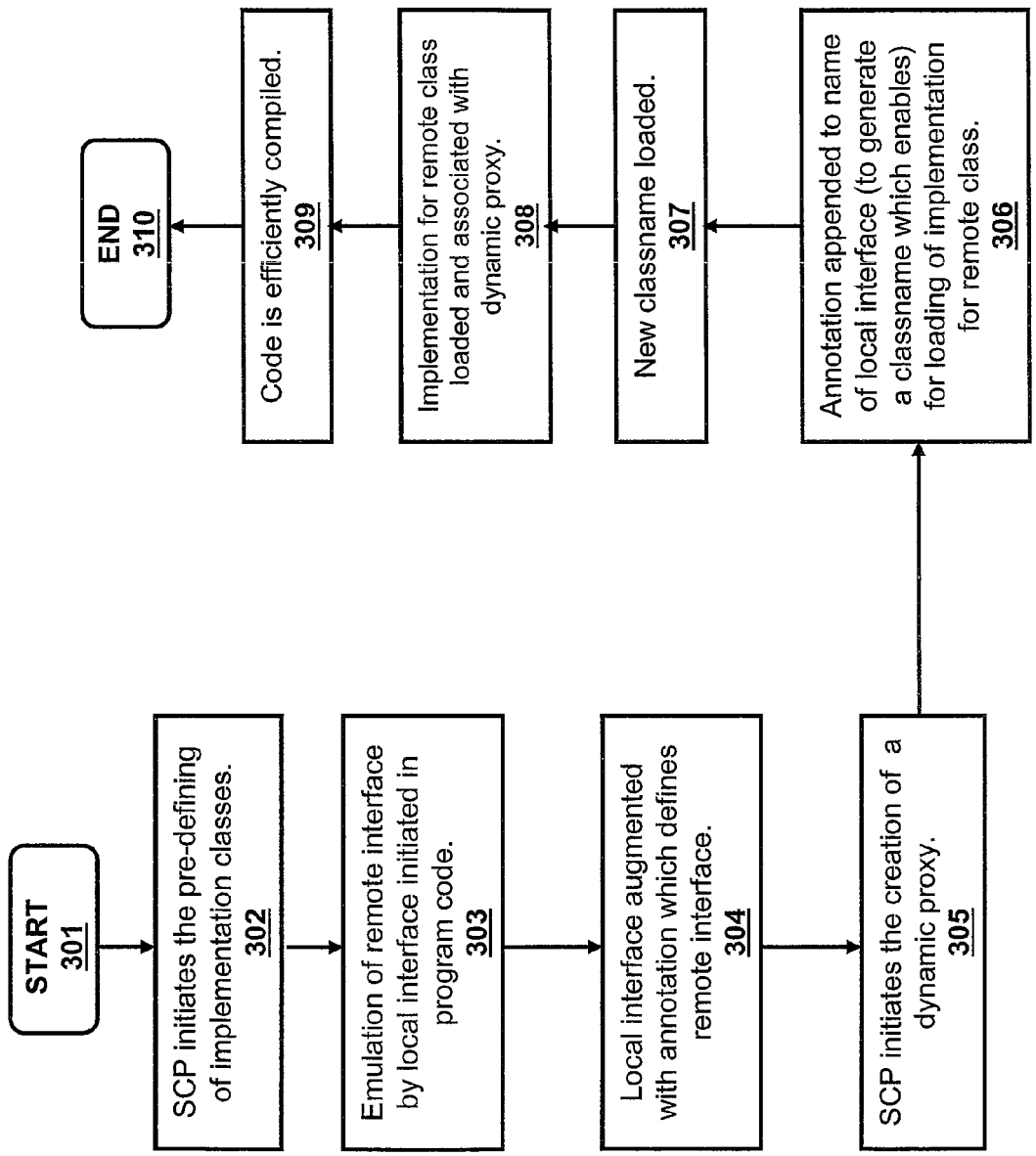

DECOUPLING COMPONENTS OF A SOFTWARE SYSTEM AT COMPILE TIME AND LOAD TIME

BACKGROUND OF THE INVENTION

1. Technical Field

The present invention generally relates to computer systems and in particular to decoupling the components of a computer software system.

2. Description of the Related Art

In Java, as well as in other object oriented programming languages, partitioning a complex system into disjoint parts such that no compile-time dependencies exists between components is a very difficult task. An inability to partition components causes development environments to become very large, even for simple tasks (e.g., making a small fix on one component). The large increase in the development environment is due to the required presence of most of the application on the classpath for compilation. Thus, compilation becomes a very slow process.

Additionally, remote classloading is inherently slow, which further increases compilation time. For applications that make extensive use of remote (universal record locator (URL)) classloading, it is logical to load only the classes that are absolutely necessary (i.e. "just enough" lazy loading). In the absence of some clean delineation of components, a decision about which classes are loaded at a given point in time is somewhat difficult.

SUMMARY OF THE EMBODIMENTS

Disclosed are a method, system and computer program product for decoupling components of a software system at load/compile time to accelerate application startup times. In particular, a software components partitioning (SCP) utility pre-defines a number of (implementation) classes to initiate and facilitate the decoupling process. The SCP utility allows the method names and argument lists to be recorded from a remote interface into a local interface which emulates the remote interface. The local interface is augmented with an annotation to define the remote interface. Additionally, a pre-defined keyword is appended to the name of the local interface to enable the creation of a (pre-defined) classname. Furthermore, when the classname is loaded, an implementation (via a Java implementation class, for example) for the remote class is loaded, and the implementation is associated with a dynamic proxy that implements both the local and remote interfaces, on demand.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2B illustrates an example implementation for a remote interface, in accordance with one embodiment of the invention;

FIG. 3 is a flow chart illustrating the process of decoupling components of a computer software system, in accordance with one embodiment of the invention.

DETAILED DESCRIPTION OF AN ILLUSTRATIVE EMBODIMENT

Figure 1:
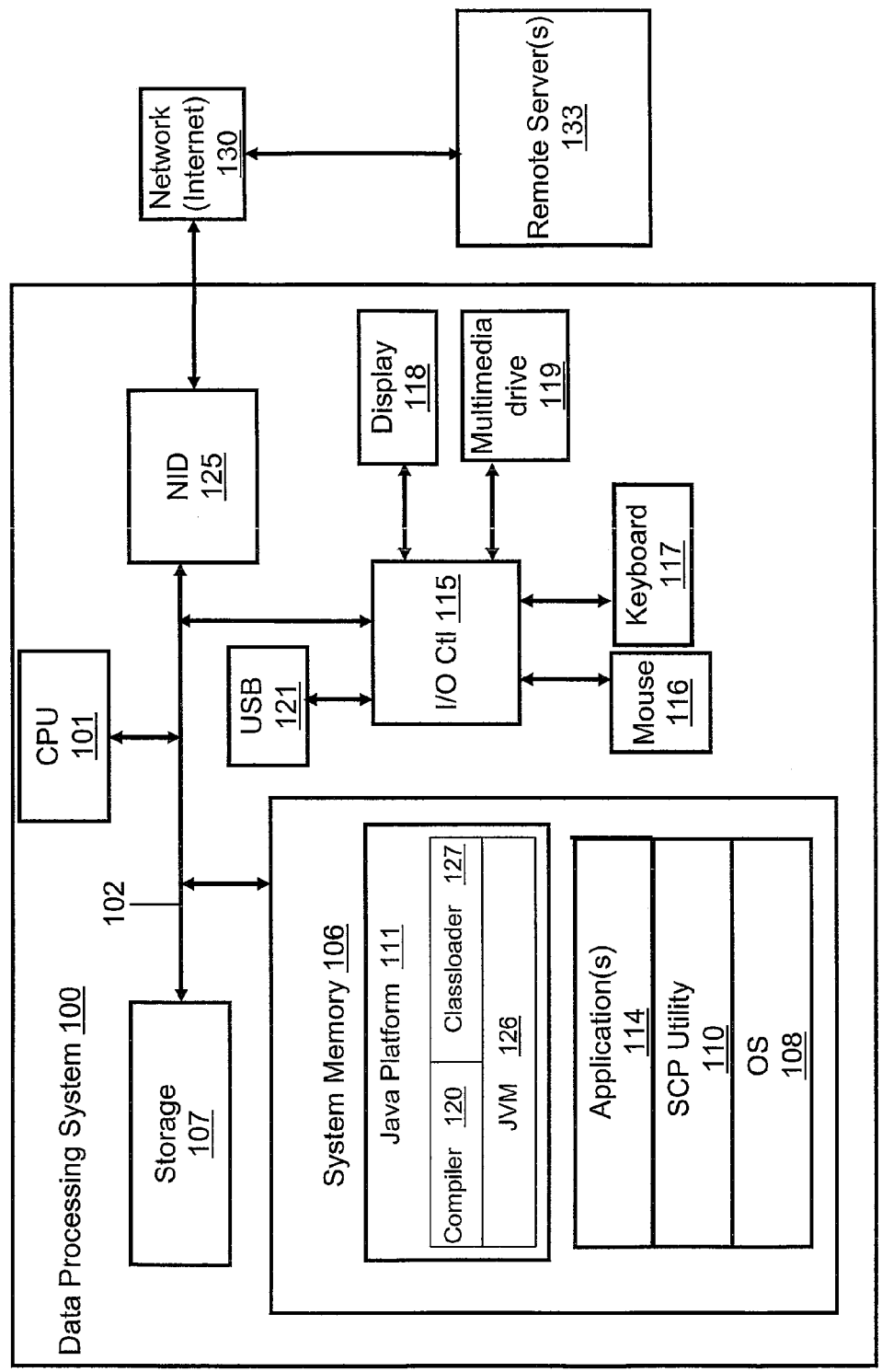
FIG. 1 is a block diagram representation of a data processing system, according to one embodiment of the invention.

The illustrative embodiments provide a method, system and computer program product for decoupling components of a software system at load/compile time to accelerate application startup times. In particular, a software components partitioning (SCP) utility pre-defines a number of (implementation) classes to initiate and facilitate the decoupling process. The SCP utility allows the method names and argument lists to be recorded from a remote interface into a local interface which emulates the remote interface. The local interface is augmented with an annotation to define the remote interface. Additionally, a pre-defined keyword is appended to the name of the local interface to enable the creation of a (pre-defined) classname. Furthermore, when the classname is loaded, an implementation (via a Java implementation class, for example) for the remote class is loaded, and the implementation is associated with a dynamic proxy that implements both the local and remote interfaces, on demand.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to FIG. 1, there is depicted a block diagram representation of a data processing system (and connected network). DPS 100 comprises central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to example server 133 via an access network 130, such as the Internet. In the described embodiments, Internet represents a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, Advanced Interactive Executive (AIX) operating system or GNU®/Linux®, registered trademarks of the Free Software Foundation and The Linux Mark Institute), applications 114, Java Platform 111 and software components partitioning (SCP) utility 110. In actual implementation, SCP utility 110 may be combined with features of OS 108 to provide the various functions of each individual software component when the corresponding code is executed by CPU 101. For simplicity, SCP utility 110 is illustrated and described as a stand alone or separate software/firmware component, which provides specific functions, as described herein.

CPU 101 executes SCP utility 110 as well as OS 108, which supports the user interface features of SCP utility 110. Among the software code/instructions provided by SCP utility 110, and which are specific to the invention, are: (a) code for allowing a set of method names and argument lists to be recorded from a remote interface into a local interface; (b) code for defining the remote interface when the local interface is augmented with a predefined annotation; (c) code for enabling the generation of a new classname when a predefined keyword is appended to the name of the local interface; and (d) code for enabling the implementation of the remote class which implementation is associated with a dynamic proxy which implements both the local and remote interfaces. For simplicity of the description, the collective body of code that enables these various features is referred to herein as SCP utility 110. According to the illustrative embodiment, when CPU 101 executes SCP utility 110, DPS 100 initiates a series of processes that enable the above functional features as well as additional features/functionality, which are described below within the description of FIGS. 2-3.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Java platform 111 is a bundle of related programs which allow for developing and running programs written in the Java programming language. The platform is not specific to any one processor or operating system, but rather, an execution engine (called a virtual machine) and a compiler with a set of standard libraries are implemented for various hardware and operating systems so that Java programs may run identically on all of the various systems. The Java Platform consists of several programs, each of which provides a distinct portion of its overall capabilities. For example, there is the Java language compiler (illustrated as compiler 120) that converts Java source code into Java bytecode (an intermediate language for the Java Virtual Machine (JVM)) and provided as part of the Java Development Kit (JDK). There is a sophisticated Java Runtime Environment (JRE) that usually implements the JVM (illustrated as JVM 126) by means of a just-in-time (JIT) compiler that converts intermediate bytecode into native machine code on the fly. There are extensive libraries (pre-compiled into Java bytecode) containing reusable code, as well as numerous ways for Java applications to be deployed, including being embedded in a web page as an applet. The essential components in platform 111 are Java language compiler 120, the libraries, and the runtime environment in which Java intermediate bytecode "executes" according to the rules laid out in the virtual machine specification.

The Java classloader (illustrated as classloader 127) is a part of the Java Runtime Environment that dynamically loads Java classes into JVM 126. Usually classes are only loaded on demand. The Java run time system does not need to know about files and file systems because of class loaders.

A software library is a collection of related object code. In the Java language, libraries are typically packaged in Jar files. Libraries may contain various different sorts of objects, the most important type of object contained in a Jar file is a Java class. A class may be thought of as a named/labeled unit of code. The class loader is responsible for locating libraries, reading the contents, and loading the classes contained within the libraries. This loading is typically done "on demand", in that the loading does not occur until the class is actually used by the program. JVM 126 caches all the classes that are loaded by a classLoader. A class that has previously been loaded by a classLoader is not loaded again.

The Java class libraries serve three purposes within the Java Platform. Like other standard code libraries, the Java class libraries provide the programmer a well-known set of functions to perform common tasks, such as maintaining lists of items or performing complex string parsing. In addition, the class libraries provide an abstract interface to tasks that would normally depend heavily on the hardware and operating system. Tasks such as network access and file access are often heavily dependent on the native capabilities of the platform. The Java java.net and java.io libraries implement the required native code internally, then provide a standard interface for the Java applications to perform those tasks. Finally, some underlying platforms may not support all of the features a Java application expects. In these cases, the class libraries can either emulate those features using whatever is available, or provide a consistent way to check for the presence of a specific feature.

According to one embodiment of the invention, a process to emulate a required remote interface is initiated by recording a set of method names and argument lists from the remote interface into the local interface. The recording process may be achieved via manual or automatic processes. The emulation process enables the decoupling of components of a Java software system to accelerate startup times.

In the Java programming language, an interface is an abstract type that classes implement. Interfaces are declared using the "interface" keyword, and may only contain method signatures and constant declarations (variable declarations which are declared to be both "static" and "final"). As interfaces are "abstract", interfaces may not be directly instantiated. Object references in Java may be specified to be of an interface type; in which case these object references are either null, or bound to an object which implements the interface. The keyword "implements" is used to declare that a given class implements an interface. A class which implements an interface either implements all methods in the interface, or is an abstract class.

Objects with methods that may be invoked across Java virtual machines are called remote objects. An object becomes remote by implementing a remote interface. In this case, remote simply means in a separate component, and local means within the same component. The interface exists in a code-base, which is foreign to the user's component code-base. "Remote" refers to a separate Java Virtual Machine (JVM) which may possibly reside on a separate server.

Referring again to the one embodiment of the invention, the method signatures defined in the remote interface are copied into a local interface. Thus, a subsequent compilation process is satisfied by the local interface standing in for the remote interface, and the entire remote jar is not required. The local interface is annotated with a pre-defined annotation which alerts the runtime that the local interface is a stand-in to the remote interface.

SCP utility 110 initiates the creation of a dynamic proxy which subsequently implements the local and remote interfaces. An attempt to load an implementation for a given interface (including interfaces within a given component) is done by convention: the name of the (local) interface is appended with "impl" (a pre-defined keyword), for example, and the resulting classname (FIG. 2B) is loaded. This convention may be overridden by a configuration file, however. When the class loader is asked to load an implementation for (i.e., a class which may implement) a local interface proxying to (i.e., acting as a substitute for) a remote interface, the class loader instead loads an implementation for the remote class, and associates the implementation class with the dynamic proxy that implements both local and remote interfaces.

Figure 2A:
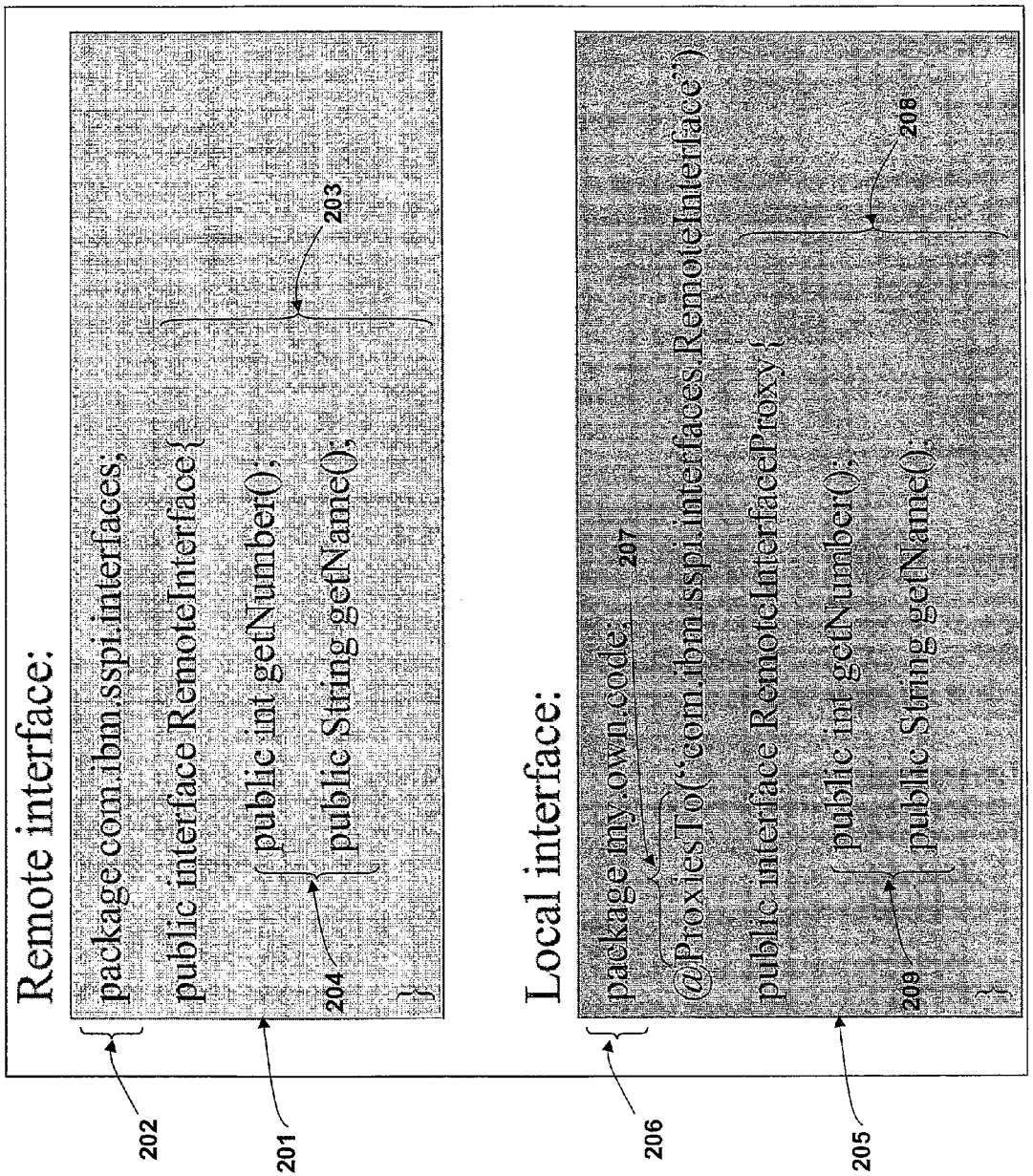
FIG. 2A illustrates a remote interface and a substituting local interface, in accordance with one embodiment of the invention.

With reference now to FIG. 2A, a remote interface and a substituting local interface is illustrated, according to one embodiment of the invention. Interface set 200 comprises remote interface set 201 and local interface set 205. Remote interface set 201 comprises first package id 202, Remote interface 203 and a set of methods (illustrated as first methodset 204). Local interface set 205 comprises second package id 206, local interface (RemoteInterfaceProxy) 208 and a set of methods (illustrated as second methodset 209). Local interface 208 also comprises annotation 207.

Remote interface 201 is an interface exposed by a foreign component, i.e., the interface is in a codebase that is separate to the local component's codebase. Consequently, first package id 202 differs from second package id 206. The code has a dependency on that remote interface, but in order to keep the separation clean such that the local component may be compiled without a classpath reference to any foreign components, a mechanism employing a local interface which emulates a remote interface is utilised.

The method signatures (first methodset 204) defined in remote interface 203 are copied into local interface 208. The signature of a method is the combination of the method's name along with the number and types of the parameters (and the order of the parameters). By copying the method signatures into local interface 208, compilation is satisfied by local interface 208 standing in for remote interface 203. Local interface 208 is annotated with a "ProxiesTo" annotation 207 which alerts the runtime that local interface 208 is a stand-in for remote interface 203.

In the Java programming language, a dynamic proxy is created when the "Proxy.getProxyClass" method returns the "java.lang.Class" object for a proxy class given a class loader and an array of interfaces. The proxy class is defined in the specified class loader and implements all of the supplied interfaces. If a proxy class for the same permutation of interfaces has already been defined in the class loader, then the existing proxy class is returned; otherwise, a proxy class for those interfaces is generated dynamically and defined in the class loader.

Dynamic proxies proxy (i.e., provides a substitute for) the first method specified (in the implemented interfaces array passed during proxy creation) when multiple interfaces include the same name. Method invocations on an instance of a dynamic proxy class are dispatched to a single method. In accordance with the embodiment, since both interfaces implemented by a given dynamic proxy contain an identical set of methods, the remote interface is passed first in the implemented interfaces array when creating the proxy. Then, any invocation of a method on either (local or remote) interface results in the remote interface's copy of the method being proxied to (i.e., a proxy/substitute for the target method is provided by) the underlying method implementation in the generated proxy class.

FIG. 2B illustrates an example implementation of the remote interface, according to one embodiment of the invention. Class 210 is identified by classname 211 and comprises methodset 212. Class 210 is identified by classname 211, which is formed when the name of (local) interface 208 is appended with "impl" (a pre-defined keyword) to form classname 211. This convention may be overridden by a configuration file, however. When the class loader is asked to load an implementation for (i.e., a class which may implement) a local interface proxying to (i.e., acting as a substitute for) a remote interface, the class loader instead loads an implementation for the remote class (class 210), and associates implementation class 210 with the dynamic proxy that implements both local and remote interfaces.

FIG. 3 is a flow chart illustrating the decoupling of software components, according to an illustrative embodiment of the invention. Although the method illustrated in FIG. 3 may be described with reference to components shown in FIGS. 1-2, it should be understood that this is merely for convenience and alternative components and/or configurations thereof can be employed when implementing the various methods. Key portions of the methods may be completed by SCP utility 110 executing within DPS 100 (FIG. 1) and controlling specific operations of/on DPS 100, and the methods are thus described from the perspective of either/both SCP utility 110 and DPS 100.

The process of FIG. 3 begins at initiator block 301 and proceeds to block 302, at which software components partitioning (SCP) utility 110 initiates the pre-defining (if not already defined) of the implementation classes that are employed in the various steps of the decoupling of software components. The process then moves to block 303, at which SCP utility 110 allows the method names and argument lists to be recorded from a required remote interface into a local interface, initiating a process to alert the runtime that the local interface emulates the remote interface. At block 304, the local interface is augmented with an annotation to define the remote interface. The process is initiated when one or more classes are pre-defined (block 302) to allow the local interface to be augmented with an annotation which defines the remote interface. The decoupling process proceeds when a user/operator appends the annotation to the name of the local interface, in the code development process, to generate a (pre-defined) classname (FIG. 2B) which indicates that a local interface emulates a remote interface.

At block 305, the SCP utility initiates the creation of a dynamic proxy to implement both the local and remote interfaces during a subsequent runtime. The dynamic proxy is created (via the "Proxy.getProxyClass" method) by specifying the class loader and an array of interfaces. This dynamic proxy is implemented such that invocations on the local interface are proxied to the underlying implementation of the remote interface.

The order of the specified proxy interfaces is significant: two requests for a proxy class with the same combination of interfaces but in a different order results in two distinct proxy classes. Proxy classes are distinguished by the order of the corresponding proxy interfaces in order to provide deterministic method invocation encoding in cases where two or more of the proxy interfaces share a method with the same name and parameter signature.

According to one embodiment, since both interfaces implemented by a given dynamic proxy contain an identical set of methods, the remote interface is passed first in the implemented interfaces array when creating the proxy. Then, any invocation of a method on either interface results in the remote interface's copy of the method being proxied to the underlying implementation.

According to one embodiment, an annotation is pre-defined to enable the subsequent loading of an implementation for the remote class. The Java Classloader dynamically loads Java classes into the Java Virtual Machine. Usually classes are only loaded on demand, in that loading does not occur until the class is actually used by the program. The class loader is responsible for locating libraries, reading their contents, and loading the classes contained within the libraries.

At block 306, the annotation (for example, "Impl") is appended to the name of the local interface in the code development process to generate a classname which, during a subsequent loading process, enables the loading of an implementation for the remote class. Thus, with reference to the example of FIG. 2A, and FIG. 2B, "RemoteInterfaceProxyImpl" is the generated classname. At block 307, the SCP utility detects the loading of the new classname. By loading the new classname, the class loader is being asked to load an implementation for a local interface proxying to a remote interface. However, the class loader instead loads an implementation for the remote class, and associates the implementation with the dynamic proxy that implements both local and remote interfaces, as shown at block 308.

At block 309, the java code is compiled. Compilation is satisfied by the local interface standing in for the remote interface, and the entire remote jar is not required. Furthermore, runtime classloading policies may be enforced such that remote interfaces and the corresponding implementations may not be loaded until required by some user or system action. Thus, the user and system experience much faster startup times. The process ends at block 310.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:
1. In a data processing system with a Java platform, a method comprising:
   pre-defining, at a load/compile time, a number of implementation classes required to facilitate a decoupling of software components, at the load/compile time, to accelerate application startup;

recording one or more method names and one or more argument lists from a required remote interface into a local interface;

augmenting the local interface to include a ProxiesTo annotation that defines the remote interface in order to alert a runtime process that the local interface emulates the remote interface;

initiating the creation of a dynamic proxy;

appending a predefined keyword to a name of the local interface to enable the generation of a new classname;

detecting when the new classname is loaded; and in response to the new classname being loaded:

loading an implementation for a remote class associated with the remote interface; and associating the implementation with the dynamic proxy that implements the local and remote interfaces when required by one of an action and a system action.

2. The method of claim 1, wherein said pre-defining further comprises:

creating one or more classes that enable the remote interface to be defined by the ProxiesTo annotation; and applying the ProxiesTo annotation as an augmentation to the local interface in the code development process.

3. The method of claim 1, wherein said initiating further comprises activating a function that returns a dynamic proxy, given a specified class loader and a specified set of interfaces, which set of interfaces includes the remote interface and the local interface.

4. The method of claim 1, wherein said enabling further comprises creating one or more classes and keywords that enable the generation of a classname to load an implementation for the remote class and to associate the implementation with the dynamic proxy.

5. A computer program product comprising:

a non-transitory computer readable storage medium; and program source code on said computer readable storage medium that when executed within a data communication device, said program code provides the functionality of:

pre-defining at a load/compile time, a number of implementation classes required to facilitate a decoupling of software components at the load/compile time to accelerate application startup;

recording a set of method names and argument lists from a required remote interface into a local interface;

augmenting the local interface to include a ProxiesTo annotation that defines the remote interface in order to alert the runtime that the local interface emulates the remote interface;

initiating the creation of a dynamic proxy;

appending a predefined keyword to the name of the local interface to enable the generation of a new classname;

detecting when the new classname is loaded; and in response to the new classname being loaded:

loading an implementation for a remote class associated with the remote interface; and associating the implementation with the dynamic proxy that implements the local and remote interfaces when required by one of an action and a system action.

6. The computer program product of claim 5, wherein said code for pre-defining further comprises code for:

creating one or more classes that enable the remote interface to be defined by the ProxiesTo annotation; and applying the ProxiesTo annotation as an augmentation to the local interface in the code development process.

7. The computer program product of claim 5, wherein said code for initiating further comprises code for:

employing a function which returns a dynamic proxy given a specified class loader and a specified set of interfaces which set comprises the remote interface and the local interface.

8. The computer program product of claim 5, wherein said code for enabling further comprises code for, creating one or more classes and keywords that enable the generation of a classname to load an implementation for the remote class and to associate the implementation with the dynamic proxy.

9. A data processing system comprising:

a processor which executes a Java Platform software;

a memory system which stores the Java Platform;

a utility executing on the processor which enables the processor to:

pre-define, at a load/compile time, a number of classes required to facilitate a decoupling of software components at the load/compile time to accelerate application startup;

record a set of method names and argument lists from a required remote interface into a local interface;

augment the local interface to include a ProxiesTo annotation that defines the remote interface in order to alert the runtime that the local interface emulates the remote interface;

initiate the creation of a dynamic proxy;

append a predefined keyword to the name of the local interface to enable the generation of a new classname;

detect when the new classname is loaded; and in response to the new classname being loaded:

load an implementation for a remote class associated with the remote interface; and associate the implementation with the dynamic proxy that implements the local and remote interfaces when required by one of an action and a system action.

10. The system of claim 9, wherein said pre-define function further comprises functions for enabling the processor to:

create one or more classes that enable the remote interface to be defined by the ProxiesTo annotation; and apply the ProxiesTo annotation as an augmentation to the local interface in the code development process.

11. The system of claim 9, wherein said functions that enabled the processor to initiate further comprises functions for the processor to:

employ a function which returns a dynamic proxy given a specified class loader and a specified set of interfaces which set comprises the remote interface and the local interface.

12. The system of claim 9, wherein said functions that enable further comprises functions that enable the processor to create one or more classes and keywords that enable the generation of a classname to load an implementation for the remote class and to associate the implementation with the dynamic proxy.

* * * * *